Nov. 16, 1965    P. D. NEWHOUSE ETAL    3,218,642
PASSIVE RADIO DETECTION AND DIRECTION FINDING APPARATUS
Filed Feb. 13, 1957    2 Sheets-Sheet 1

WITNESSES:
Bernard R. Gieguey
Leon M. Garman

INVENTORS
Paul D. Newhouse and
Charles M. Allen
BY Maury I. Hull
ATTORNEY

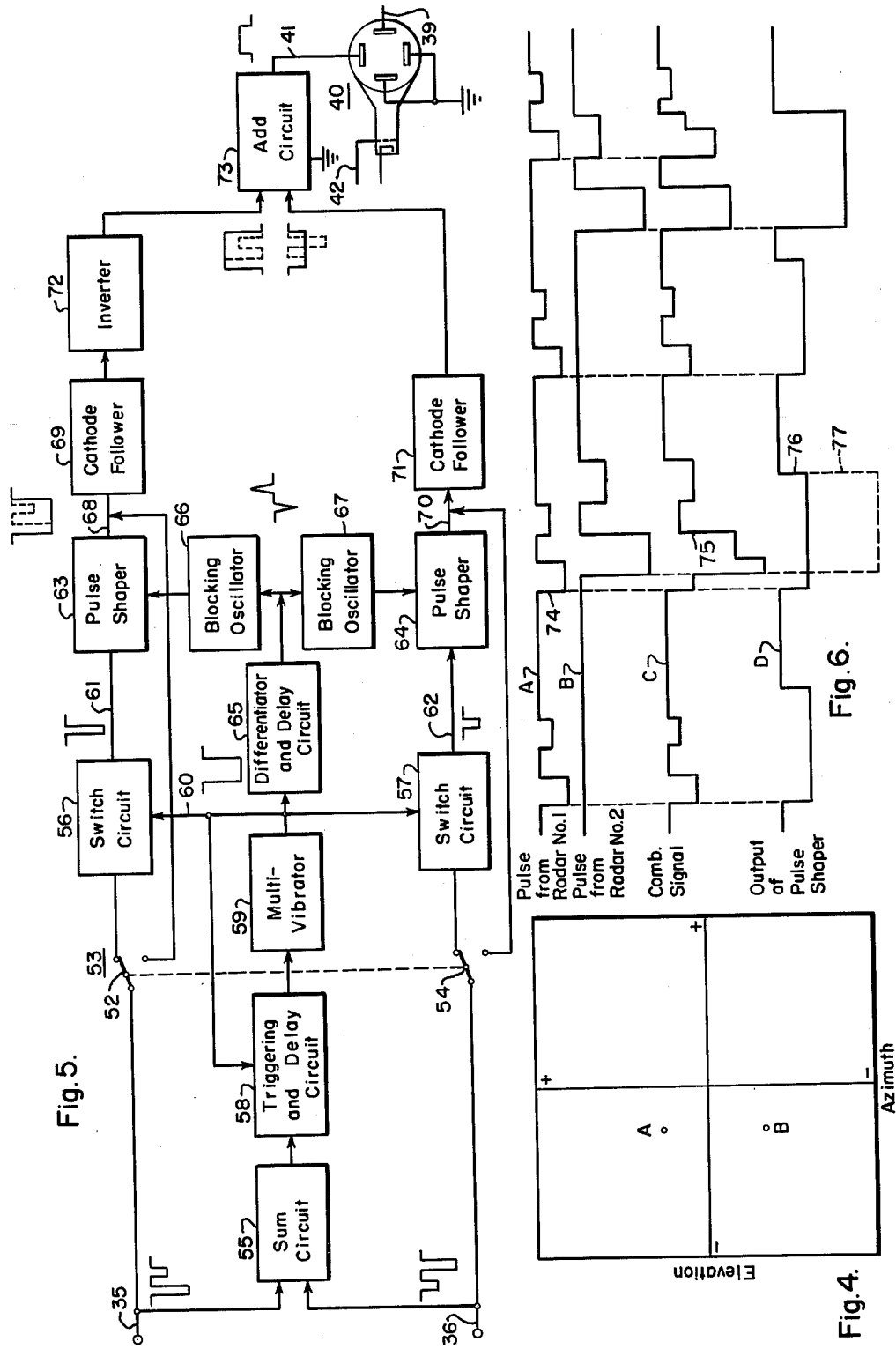

United States Patent Office 3,218,642
Patented Nov. 16, 1965

3,218,642
PASSIVE RADIO DETECTION AND DIRECTION
FINDING APPARATUS
Paul D. Newhouse, Linthicum Heights, and Charles M.
Allen, Baltimore, Md., assignors to Westinghouse Electric Corporation, East Pittsburgh, Pa., a corporation of Pennsylvania
Filed Feb. 13, 1957, Ser. No. 640,048
14 Claims. (Cl. 343—114.5)

This invention relates to improvements in passive radio detection and direction finding apparatus and more particularly to passive radio detection and direction finding apparatus having circuit means for eliminating ambiguities resulting from ground reflected signals, and further eliminating ambiguities which may result from simultaneous illumination of the passive radio detection and direction finding apparatus by two or more enemy radar transmitters.

Passive radio detection and direction finding apparatus, as the name implies, is detection and direction finding apparatus having no source of radiant energy but utilizing a source of radiant energy located elsewhere for obtaining directional information about the source with respect to the location of the passive radio detection and direction finding apparatus, and also for obtaining other information, for example, the closing time between the source and the passive radio detection and direction finding apparatus where there is relative motion between these two.

In prior art passive radio detection and direction finding apparatus, where the apparatus is located on aircraft and the source of radiant energy is located on other aircraft, ambiguities in the information supplied by the direction finding apparatus exist because energy reaches the direction finding apparatus by two paths. One of these paths is a direct line of transmission from the source to the direction finding apparatus, and the other path is provided by reflection from the earth's surface.

The apparatus of the instant invention relates particularly to the elimination of this ambiguity. Where the source of radiant energy is a series of spaced pulses having a particular repetition rate, the interval between the pulses is usually of substantially constant duration. Energy from the source arriving by a direct path follows a shorter route than energy reflected from the earth's surface, with the result that the pulses in the directly received energy occur a brief time interval before the pulses of the reflected energy, although these pulses of reflected energy are the same transmitted pulses from the source. This last-named time interval is usually considerably less than the time interval between the transmitted pulses. The apparatus of the instant invention provides gate means for eliminating the reflected pulses occurring a very brief time interval after the directly received pulses, so that indicating means for indicating the direction from the passive radio detection and direction finding apparatus to the source shows the true direction only. The gate means is also instrumental in eliminating ambiguity resulting from simultaneous reception of pulsed signals from two or more radar transmitters. Switching means is also provided whereby the aforementioned gate means may be disconnected from the circuit, to provide for displaying both the true source and the virtual or false source as indicated by the reflected transmission, to thereby reveal to the operator of the passive radio detection and direction finding apparatus that the source of the received radiant energy is airborne.

It is a primary object of the invention to provide new and improved passive radio detection and direction finding apparatus.

Another object is to provide passive detection and direction finding apparatus having special circuit means for eliminating ambiguities resulting from ground reflected signals.

Still another object is to provide passive direction finding apparatus having new and improved means for visually indicating the direction of a source of pulsed radiant energy with respect to the location of the passive direction finding apparatus.

A further object is to provide new and improved passive radio detection and direction finding apparatus having a gating circuit for substantially eliminating the effects of radiant energy reflected to the direction finding apparatus from the earth's surface.

Other objects and advantages will become apparent, after a perusal of the following specification when studied in connection with the accompanying drawings, in which:

FIG. 4 is a view of the indicating screen of cathode ray tube indicator apparatus employed in FIG. 1 while the gate controlled pulse switching feature thereof is not in use;

FIG. 5 is a schematic circuit diagram in block form of a comparator circuit constructed according to the preferred embodiment of the invention, the comparator circuit of FIG. 5 being used in both the azimuth comparator apparatus and the elevation comparator apparatus of FIG. 1; and FIG. 6 is a graph illustrating the operation of the apparatus of FIG. 5.

Figure 1:
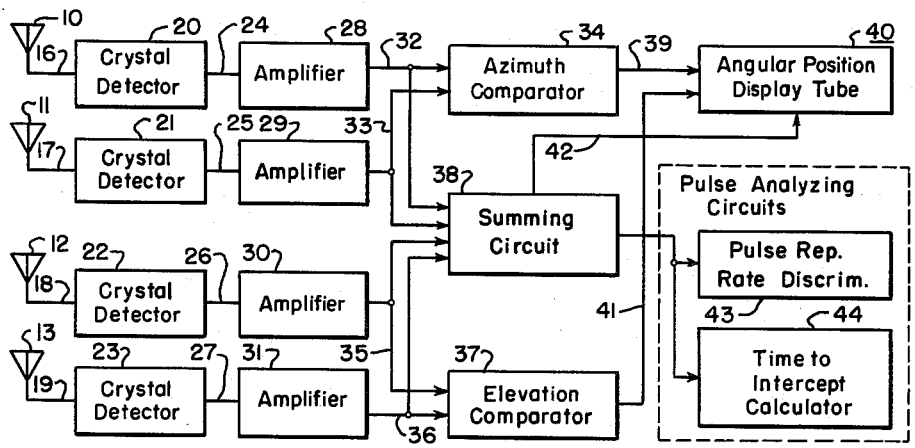
FIGURE 1 is a diagram in block form of passive radio detection and direction finding apparatus constructed according to the instant invention.

Particular reference should be made now to the drawings, in which like reference numerals are used throughout to designate like parts, and in particular to FIG. 1 thereof, in which there are shown two pairs of directional radiant energy receiving antenna means designated 10 and 11, and 12 and 13, respectively.

Figure 2A:
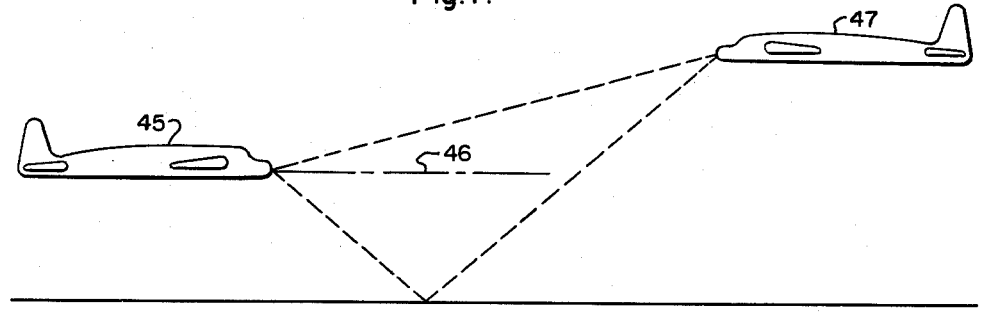
FIG. 2A is a diagram illustrating the two paths by which radiant energy from an airborne source may reach airborne passive radio detection and direction finding apparatus.
Figure 2B:
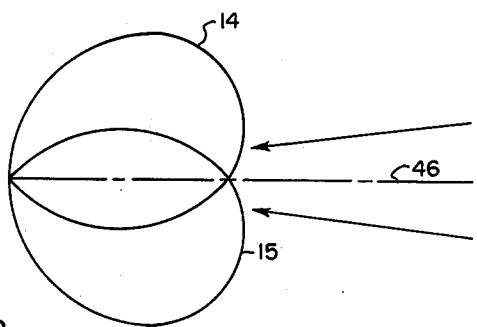
FIG. 2B is a diagram illustrating the overlapping similar patterns of response of one pair of the antennas shown in FIG. 1.

The patterns of response 14 and 15 of FIG. 2B illustrate the responses of elevation information antennas 12 and 13 respectively, having their maximum directivity in different directions in a vertical plane. It should be noted that the patterns 14 and 15 are substantially identical and that they overlap to a predetermined degree in a substantially vertical plane, for reasons to be hereinafter made more clearly apparent. The patterns of response of the azimuth information antennas 10 and 11 may be similar to those shown in FIG. 2B and there designated as 14 and 15, respectively, being patterns of response similar to each other and overlapping to a predetermined degree in a horizontal plane substantially perpendicular to the aforementioned plane of antennas 12 and 13. Any suitable means, not shown, may be employed for mounting the antennas 10, 11, 12 and 13 in preselected positions, and the antennas may be of any convenient design. Antennas 10, 11, 12 and 13 deliver their outputs by conductor means 16, 17, 18 and 19, respectively, which may be of any convenient design, to crystal detectors 20, 21, 22 and 23, respectively, the detectors delivering their outputs by way of conductor means 24, 25, 26 and 27, respectively, which may be of any convenient design, to amplifiers 28, 29, 30 and 31, respectively. All of the amplifiers may be similar and are preferably all linear or all logarithmic, and, for the purposes of the following description, will be considered as integral parts of the associate detectors respectively. Amplifiers 28 and 29 deliver their outputs by way of conductor means 32 and 33, respectively, to an azimuth comparator circuit designated 34, while amplifiers 30 and 31 deliver their outputs by conductor means 35 and 36 respectively, to an elevation comparator circuit designated 37. Preferably a summing circuit 38 is provided, the summing circuit 38 being energized by the outputs of all of the aforementioned amplifiers 28, 29, 30 and 31, as shown. The output of the azimuth comparator circuit 34 is supplied by way of conductor means 39 to indicating means generally designated 40 which may comprise an angular position display tube, whereas the output of the elevation comparator circuit 37 is supplied by way of conducting means 41 to the indicating means 40. The output of the aforementioned summing circuit 38 is supplied by way of conducting means 42 to the indicating means 40.

As aforementioned, the indicating means 40 may be cathode ray tube means having beam forming means, not shown in FIG. 1, an intensity control grid, not shown in FIG. 1, and pairs of vertical and horizontal deflection plates, not shown in FIG. 1, the output of the azimuth comparator circuit 34 being applied to the horizontal deflection plates, the output of the elevation comparator circuit 37 being applied to the vertical deflection plates, and the output of the summing circuit 38 being applied as an intensifier pulse to the intensity control grid. An arrangement is thereby provided whereby the beam of the cathode ray tube means is deflected in two planes corresponding to the planes in which the two pairs of antennas are oriented, with the result that, while a single source of pulsed radiant energy reaches the passive radio detection and direction finding apparatus by a single path, a luminous spot, not shown, appears on the screen of the cathode ray tube means in a position indicating the direction of the source of pulsed radiant energy with respect to a preselected direction or axis from the aforementioned four antenna means 10, 11, 12 and 13.

If desired, the aforementioned summing amplifier 38 may provide outputs to pulse analyzing circuits of convenient design which may include, for example, a pulse repetition rate discriminator shown in block form and designated 43, and a closing time or time-to-intercept calculator shown in block form and designated 44.

Figure 3:
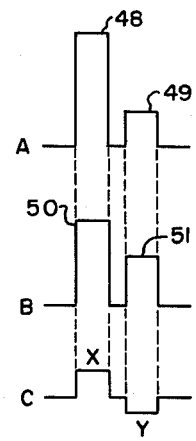
FIG. 3 is a graph illustrating the operation of the apparatus of FIG. 1 under certain conditions.

Particular attention should be paid now to FIGS. 2A, 2B and 3. In FIG. 2A let it be assumed that the passive direction finding apparatus is located on aircraft 45 and that the antennas mounted thereon are so positioned that the line 46 is the axis about which all four of the directional patterns of response are oriented. Let it be assumed that a radar transmitter or other source of pulsed radiant energy is located on the aircraft 47. Radiant energy reaching antenna 12 by way of the direct path will provide a pulse in the output of detector 22 or amplifier 30 having an amplitude corresponding to the pulse 48 of curve A of FIG. 3, whereas radiant energy reaching the antenna 12 by way of the reflection path will provide a pulse output having an amplitude corresponding to that of the pulse 49 of curve A of FIG. 3. Radiant energy reaching antenna 13 by way of the direct path will provide a pulse in the output of detector 23 or amplifier 31 having an amplitude corresponding to the pulse 50 of curve B of FIG. 3, whereas radiant energy reaching antenna 13 by way of the reflected path will provide a pulse output having an amplitude corresponding to the pulse 51 of curve B of FIG. 3. The difference output from elevation comparator 37 for direct and reflected signals will be pulses having relative amplitudes and polarities represented by the pulses X and Y respectively, of curve C of FIG. 3. Assume, by way of description, that the aircraft 47 is also somewhat off-center from the axis 46 in the other or horizontal plane of measurement. A similar effect may be noticed in the output of detectors 20 and 21 energized from the azimuth information providing antennas 10 and 11. There will result on the screen of the cathode ray indicator tube two spots A and B of FIG. 4, one of these, spot A, corresponding to the true position of the source on aircraft 47 as measured in a direction directly thereto, whereas the other spot B gives a false indication of the location of the source or aircraft 47, because the spot B is provided by the reflected energy, as will be readily understood by those skilled in the art.

Particular reference should be paid now to FIG. 5 in which a circuit constructed according to the preferred embodiment of the invention is provided for use in both the azimuth comparator apparatus 34 and the elevation comparator apparatus 37 of FIG. 1. The apparatus shown in FIG. 5 comprises, in effect, signal limiting means for limiting the pulses affecting the deflection of the beam of the cathode ray tube to those pulses obtained from radiant energy arriving by the direct transmission path. Pulse selecting means including switching circuit means is provided for this purpose. For convenience of illustration, the apparatus of FIG. 5 is described with reference to the elevation antennas 12 and 13, but it should be understood that a circuit which may be substantially identical to the circuit of FIG. 5 is provided for use in the azimuth comparator 34.

The aforementioned conductor means 35 is connected to one arm 52 of a double-pole, double-throw switch generally designated 53. Conducting means 36 is connected to the other arm 54 of the aforementioned double-pole, double-throw switch 53. The aforementioned conductor means 35 and 36 also supply inputs to a summing circuit 55, which may be of conventional design. One contact, the upper contact as viewed in FIG. 5, associated with switch arm 52, is connected to a switching circuit designated 56, whereas the corresponding upper contact associated with switch arm 54 is connected to a switching circuit 57. Arms 52 and 54 are preferably ganged as shown. The aforementioned summing circuit 55 supplies an output to a triggering circuit 58 which supplies a trigger to a multivibrator 59. The multivibrator 59 supplies a slightly delayed gating pulse by way of conductor means 60 to both of the aforementioned switch circuits 56 and 57. Preferably, the time delay of occurrence of the gate is adjustable by any convenient means, not shown, from a very short time of, for example, 0.1 microsecond to a delayed time at least as great as the width of the widest pulse to be received by the antenna means. The gate output of multivibrator 59 may also be applied by way of conductor means 60 to the aforementioned triggering circuit 58 for reasons which will be readily understood by those skilled in the art. As aforementioned, the gating pulse provided by the multivibrator 59 and applied to switching circuits 56 and 57 is delayed a very small interval of time from the beginnings of the first pulses on leads 35 and 36 which corresponds to time zero so that at least a portion of the first pulse representing the directly received radiant energy is allowed to pass by the switching circuits, whereas the second pulse representing the reflected radiant energy is blocked out by the gating pulse and is not allowed to pass. The switching circuits 56 and 57 may be of conventional design and of the usual type of electric tube circuit wherein a gating pulse supplied as one input controls the passage of other pulses applied as the second input to the switching circuit. The outputs of the switching circuits 56 and 57 are applied by way of conductor means 61 and 62 respectively, to pulse shaper circuits 63 and 64, respectively.

Each of the pulse shaper circuits 63 and 64 is constructed and arranged to stretch or broaden the pulse inputs supplied thereto, and may comprise a diode, a bucket condenser, and a triode discharge tube and may be similar to a circuit known in the art as a "box-car" circuit. The aforementioned multivibrator 59 has a portion of its output applied by way of the aforementioned conducting means 60 to a differentiator and delay circuit 65 which after a preselected time interval of, for example, 20 microseconds corresponding to the width of the gating pulse supplies an output trigger to a pair of blocking oscillators 66 and 67, which supply dunking pulse outputs to the aforementioned pulse shaper circuits 63 and 64, respectively.

The output of pulse shaper 63 is supplied by way of conducting means 68 to a cathode follower 69, and the output of pulse shaper 64 is supplied by way of conducting means 70 to a cathode follower 71. Conducting means 68 is also electrically connected to a second lower contact associated with the aforementioned switch arm 52, whereas conducting means 70 is also connected to a second lower contact associated with the aforementioned switch arm 54. These circuit connections by-passing the switch circuits 56 and 57 and pulse shapers 63 and 64 while switch 53 is in a certain selected lower position are provided, because, as previously stated, it is desirable for the operator of the apparatus to be able to cut out of the circuit that portion of the circuit which eliminates the reflected pulses, so that when desired he may obtain on the screen or other indicating means utilized a spot indicating a false or virtual source of radiant energy, to thereby provide information as to the location of the true source, whether airborne or located on the earth's surface.

The output of the cathode follower 69 is applied by way of an inverter circuit 72, which may be of conventional design, to an add circuit 73, whereas the output of the cathode follower 71 is directly applied to the add circuit 73. The output of the add circuit 73 is a pulse having an amplitude proportional to the difference in the amplitudes of the pulses supplied by pulse shapers 63 and 64, the shaped pulses being each proportional in amplitude to the initial pulses supplied by detectors 22 and 23, respectively, from antennas 12 and 13, and having a polarity which varies from positive to negative in accordance with which of the two pulse shapers 63 and 64 supplies the pulse of greater amplitude. This pulse output of add circuit 73 of varying amplitude and polarity is applied by way of aforementioned conductor means 41 to the vertical deflection plates of the aforementioned cathode ray tube means 40, to provide an indication of the direction of the source from the passive radio detection and direction finding apparatus as measured in the vertical plane of measurement.

As aforementioned, a circuit similar to that of FIG. 5 is provided for use in the azimuth comparator 34, with the result that when the gating portion of the circuit is connected in circuit in accordance with the setting of the double-pole, double-throw switch 53 and the corresponding double-pole, double-throw switch, not shown, of the azimuth comparator, a single spot appears on the screen of the cathode ray tube substantially indicative of the tube direction of the source of radiant energy with respect to the location of the passive radio detection and direction finding apparatus.

Particular reference should be made now to FIG. 6 which is a graph illustrating the operation of the apparatus of FIG. 5, and showing the relative amplitudes and shapes of the various pulses at various points along the circuit of FIG. 5, while the passive direction finding apparatus is receiving pulses from the two sources, for example radars 1 and 2 located on two enemy aircraft. Curves A and B illustrate the amplitudes and times of the two chains of partially coincident pulses as they may appear, for example, on lead 35. Curve C shows the combined signal. Curve D shows the output of the pulse shaper 63 with the switch arms 52 and 54 in their upper positions. The gate, occurring a brief instant after the beginning of pulse 74, cuts off the remaining pulse portion 75 of greater amplitude, so that a broadened pulse 76 corresponding in amplitude to pulse 74 is obtained from the pulse shaper 63. The time periods during which the switch circuits 56 and 57 are idle after clipping off the leading portions of the pulses are made longer than the widths of the pulse outputs of the pulse shapers 63 and 64 respectively. The pulse 77 represents the effective amplitude of the signal which would result in a false indication on indicator 40 which would occur with the switch 53 in its lower setting as seen in FIG. 5.

The passive radio detection and direction finding apparatus of the instant invention may be employed while repeater jammer apparatus on the same aircraft or other aircraft in the same formation is in operation. As will be readily understood by those skilled in the art, repeater jammer apparatus provides a pulse which is transmitted very soon after a pulse of radio frequency energy is received from enemy radar. The delay is usually programmed and may vary from 0.2 to 10 microseconds. Because of the blanking arrangement while the switch 53 of FIG. 5 is in its upper position, the transmitted pulse from the repeater jammer will not cause a false indication on the direction finding indicator.

Whereas crystal detectors have been shown and described, it should be understood that any suitable type of detector could be employed, if desired.

If desired, pairs of antennas having dissimilar patterns of response could be employed, suitable recalibration of the indicator screen being made.

Whereas the apparatus has been shown and described with respect to a preferred embodiment thereof which gives satisfactory results, it should be understood that changes and modifications may be made and equivalent substituted without departing from the scope of the invention.

We claim as our invention:

1. Passive radio detection and direction finding apparatus comprising, in combination, a first pair of radiant energy receiving antenna means adapted to receive pulses of radiant energy, said first pair of antenna means having similar directional patterns of response, said first pair of antenna means being disposed in predetermined positions with respect to each other whereby the patterns of response overlap to a predetermined degree in a first plane, a second pair of radiant energy receiving antenna means adapted to receive pulses of radiant energy, said second pair of antenna means having similar directional patterns of response, said second pair of antenna means being mounted in predetermined positions with respect to each other whereby the last-named patterns of response overlap to a predetermined degree in a second plane substantially perpendicular to the first plane, four detector means operatively connected to the antenna means of both said pairs respectively for obtaining demodulated outputs therefrom in the form of chains of pulses, the pulses in the output of each of said four detector means being substantially proportional in amplitude to the signal strength applied to the detector means in accordance with the directional patterns of response of the antenna means operatively connected thereto, pulse selector means including pulse generating means and gating means adapted to be opened for a brief interval of time to permit the passage of the first portion of a pulse and to be thereafter closed for a predetermined period of time under the control of the pulse generating means, said pulse selector means being operatively connected to all said detector means for selecting certain pulses while rejecting other pulses occurring within a predetermined time interval after said certain pulses, and indicator means operatively connected to said pulse selector means for utilizing the selected pulses to provide an indication of the direction of the source of radiant energy with respect to the passive radio detection and direction finding apparatus as measured in said first and second planes.

2. Passive radio detection and direction finding apparatus comprising, in combination, a first pair of radiant energy receiving antenna means adapted to receive pulses of radiant energy, said first pair of antenna means having similar directional patterns of response lying in different directions, said first pair of antenna means being disposed in predetermined position with respect to each other whereby the patterns of response overlap to a predetermined degree in a first plane, said first plane being normally vertical, a second pair of radiant energy receiving antenna means adapted to receive pulses of radiant energy, said second pair of antenna means having similar directional patterns of response lying in different directions, said second pair of antenna means being mounted in predetermined positions with respect to each other whereby the last-named patterns of response overlap to a predetermined degree in a second normally horizontal plane, four detector means operatively connected to the antenna means of both said pairs respectively for obtaining demodulated outputs therefrom in the form of chains of pulses, the pulses in the output of each of said four detector means being substantially proportional in amplitude to the signal strength applied to the detector means in accordance with the directional pattern of response of the antenna means operatively connected thereto, first pulse selector means including a pair of switching circuit means operatively connected to two of said detector means, second pulse selector means including a pair of switching circuit means operatively connected to the other two of said detector means, both said pulse selector means being constructed and arranged whereby pulses occurring in said demodulated outputs within a predetermined time interval after other initial pulses are not passed by the switching circuit means, each of said switching circuit means including means for clipping off the leading portion of a pulse applied thereto and utilizing the clipped portion to provide an additional pulse having a predetermined width and an amplitude equal to the amplitude of the clipped portion, and indicator means operatively connected to both said pulse selector means, said indicator means being constructed and arranged to utilize the pulses provided by the switching circuit means to provide an indication of said source of radiant energy with respect to the passive radio detection and direction finding apparatus as measured in said first and second planes.

3. Passive radio detection and direction finding apparatus comprising, in combination, a first pair of radiant energy receiving antenna means adapted to receive pulses of radiant energy, said first pair of antenna means having similar directional patterns of response, said first pair of antenna means being disposed in predetermined positions with respect to each other whereby the patterns of response overlap to a predetermined degree in a first plane, a second pair of radiant energy receiving antenna means adapted to receive pulses of radiant energy, said second pair of antenna means having similar directional patterns of response, said second pair of antenna means being mounted in predetermined positions with respect to each other whereby the last-named patterns of response overlap to a predetermined degree in a second plane substantially perpendicular to the first plane, four detector means operatively connected to the antenna means of both said pairs respectively for obtaining demodulated outputs therefrom in the form of chains of pulses, the pulses in the output of each of said four detector means being substantially proportional in amplitude to the signal strength applied to the detector means in accordance with the directional pattern of response of the antenna means operatively connected thereto, first and second pulse selector means, each of said pulse selector means including a pair of switching circuit means, said first pulse selector means being operatively connected to a first pair of said detector means and said second pulse selector means being operatively connected to the other pair of said detector means, said pulse selector means being constructed and arranged whereby pulses occurring in said demodulated outputs within a predetermined time interval after other initial pulses are not passed by the switching circuit means, a plurality of pulse shaper means operatively connected to the switching circuit means respectively, and indicator means operatively connected to all said pulse shaper means, said indicator means being constructed and arranged to utilize the shaped outputs of the pulse shaper means to provide an indication of the direction of said source of radiant energy from the passive radio detection and direction finding apparatus as measured in said first and second planes.

4. Passive radio detection and direction finding apparatus comprising, in combination, a first pair of radiant energy receiving antenna means adapted to receive pulses of radiant energy, said first pair of antenna means having similar directional patterns of response, said first pair of antenna means being disposed in predetermined positions with respect to each other whereby the patterns of response overlap to a predetermined degree in a first plane, a second pair of radiant energy receiving antenna means adapted to receive pulses of radiant energy, said second pair of antenna means having similar directional patterns of response, said second pair of antenna means being mounted in predetermined positions with respect to each other whereby the last-named patterns of response overlap to a predetermined degree in a second plane substantially perpendicular to the first plane, two pairs of detector means operatively connected to said pairs of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, pulse selector means including four switching circuit means operatively connected to the four detector means respectively, said pulse selector means being constructed and arranged whereby pulses occurring in said demodulated outputs within a predetermined time interval after other initial pulses are not passed through the switching circuit means, each of said switching circuit means including means for clipping off the leading portion of a pulse applied thereto and utilizing the clipped portion to provide an additional pulse having a predetermined width and an amplitude equal to the amplitude of the clipped portion, cathode ray tube indicator means including beam forming means and having a pair of horizontal deflection plates and a pair of vertical deflection plates, and means operatively connecting said cathode ray tube indicator means to said pulse selector means, the outputs of said four switching circuit means being applied to the four deflection plates of the cathode ray tube indicator means whereby said beam is deflected in a first deflection plane according to differences in the amplitudes of the other initial pulses obtained from the first pair of detector means, and said beam is deflected in a second deflection plane substantially perpendicular to the first deflection plane in accordance with differences in the amplitudes of the other initial pulses obtained from the second pair of detector means to thereby provide an indication on said cathode ray tube indicator means of the direction of the source of said radiant energy with respect to a preselected direction from all of said antenna means as measured in said first and second planes.

5. Passive radio detection and direction finding apparatus comprising, in combination, a first pair of radiant energy receiving antenna means adapted to receive pulses of radiant energy, said first pair of antenna means having similar directional patterns of response, said first pair of antenna means being disposed in predetermined positions with respect to each other whereby the patterns of response overlap to a predetermined degree in a first plane, a second pair of radiant energy receiving antenna means adapted to receive pulses of radiant energy, said second pair of antenna means having directional patterns of response similar to each other, said second pair of antenna means being mounted in predetermined positions with respect to each other whereby the last-named patterns of response overlap to a predetermined degree in a second plane substantially perpendicular to the first plane, four detector means respectively operatively connected to both said pairs of antenna means for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, four signal limiting means operatively connected to and energized from said four detector means respectively, each of said signal limiting means being constructed and arranged to provide other pulse outputs, said other pulse outputs corresponding in amplitude to the amplitude of the pulse output of the detector means while being unaffected by received pulsed energy arriving at the respective antenna means within a predetermined time after other initial received pulsed energy, cathode ray tube indicator means including beam forming means and having a pair of horizontal deflection plates and a pair of vertical deflection plates, and means operatively connecting all said signal limiting means to all the deflection plates of the cathode ray tube indicator means whereby said beam is deflected in a first deflection plane according to differences in the amplitudes of the pulses obtained from the pair of detector means operatively connected to the first pair of antenna means and corresponding to said other initial pulsed energy, and said beam is deflected in a second deflection plane substantially perpendicular to the first deflection plane in accordance with differences in the amplitudes of the pulses obtained from the pair of detector means operatively connected to the second pair of said antenna means and corresponding to said other initial pulsed energy to thereby provide an indication on said cathode ray tube indicator means of the direction of the source of said radiant energy with respect to a preselected direction from all of said antenna means as measured in said first and second planes.

6. In passive radio detection and direction finding apparatus, in combination, signal obtaining means for obtaining from pulsed radiant energy received from a source a pulsed obtained signal having at least one varying characteristic which varies in accordance with variations in the angular direction to the source as measured in a predetermined plane with respect to a predetermined direction from the passive direction finding apparatus, said signal obtaining means including means for eliminating from the obtained signal pulsed radiant energy arriving within a predetermined time after other initial pulsed radiant energy, said last-named means including switching means for slicing off the front portions of the first received pulses only and stretching these sliced portions to provide stretched pulses retaining said varying characteristic, and indicator means operatively connected to said signal obtaining means, said indicator means being constructed and arranged to utilize the varying characteristic of the stretched pulses to provide an indication of the direction to the source as measured in said predetermined plane.

7. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane; a pair of detector means operatively connected to the pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto; pulse selector means including a pair of switching circuit means operatively connected to said pair of detector means respectively, said pulse selector means including means for summing the outputs of said pair of detector means and multivibrator gate producing means operatively connected to said summing means for utilizing the output of the summing means to produce a gate having a predetermined time delay, said gate being applied to the pair of switching circuit means, said pulse selector means being constructed and arranged whereby pulses occurring in said demodulated outputs within a predetermined time interval after other initial pulses are not passed by the switching circuit means; means operatively connected to the switching circuit means for shaping the pulses passed by the switching circuit means; and indicator means operatively connected to said shaping means, said indicator means being constructed and arranged to utilize the shaped pulses to provide an indication of the direction of said source of radiant energy with respect to said direction finding apparatus as measured in said predetermined plane.

8. In radio detection and direction finding apparatus, in combination, a pair of radiant energy receiving antenna means adapted to receive pulses of radiant energy, said pair of antenna means having similar directional patterns of response lying in different directions, said pair of antenna means being disposed in predetermined positions with respect to each other whereby the patterns of response overlap to a predetermined degree in a predetermined plane, a pair of detector means operatively connected to said pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, pulse selector means including a pair of switching circuit means operatively connected to said pair of detector means respectively, said pulse selector means being constructed and arranged whereby pulses occurring in said demodulated outputs within a predetermined time interval after other initial pulses are not passed by said switching circuit means, each of said switching circuit means including means for clipping off the leading portion of a pulse applied thereto and utilizing the clipped portion to provide an additional pulse having a predetermined width and an amplitude equal to the amplitude of the clipped portion, and cathode ray tube indicator means including beam forming means and having a pair of deflection plates, said cathode ray tube indicator means being operatively connected to said pulse selector means, the outputs of said pair of switching circuit means being applied to said pair of deflection plates whereby said beam is deflected in a predetermined plane of deflection according to differences in the amplitudes of the other initial pulses, to thereby provide an indication on said cathode ray tube indicator means of the direction of the source of said radiant energy with respect to a preselected direction from said pair of antenna means as measured in said predetermined plane.

9. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to the pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, a pair of switching circuit means operatively connected to said pair of detector means respectively to receive the outputs thereof, summing circuit means operatively connected to and energized from both detector means of said pair, gate producing multivibrator means operatively connected to and controlled by the output of said summing circuit means, means for applying the gate to both of said switching circuit means, each of said switching circuit means being constructed and arranged whereby pulses applied thereto within a predetermined time interval after other initial pulses are not passed by the switching circuit means, cathode ray tube indicator means including beam forming means and having a pair of deflection plates, and means operatively connecting said cathode ray tube indicator means to said switching circuit means, the outputs of said pair of switching circuit means being applied to the pair of deflection plates whereby said beam is deflected in a preselected deflection plane according to differences in the amplitudes of the other initial pulse.

10. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to and energized from the pair of antenna means respectively, for obtaining demodulated outputs therefrom in the form of chains of pulses, the pulses in the output of each of said detector means being substantially proportional in amplitude to the signal strength applied to the detector in accordance with the directional pattern of response of the antenna means operatively connected thereto, pulse selector means including a pair of switching circuit means operatively connected to said pair of detector means respectively, said pulse selector means being constructed and arranged whereby pulses occurring in said demodulated outputs within a predetermined time interval after other initial pulses are not passed by the switching circuit means, a pair of pulse shaper means operatively connected to and energized from said switching circuit means respectively, cathode ray tube indicator means including beam forming means and having a pair of deflection plates, and means operatively connecting said cathode ray tube indicator means to said pair of pulse shaper means, the outputs of said pair of pulse shaper means being applied to said pair of deflection plates whereby the beam of the cathode ray tube indicator means is deflected in a preselected deflection plane according to differences in the amplitudes of the other initial pulses.

11. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to and energized from the pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, a pair of pulse selector means operatively connected to said pair of detector means respectively for selecting certain pulses in the outputs thereof and rejecting other pulses, a pair of pulse shaper means operatively connected to said pair of pulse selector means respectively and energized therefrom, and cathode ray tube indicator means operatively connected to said pair of pulse shaper means, said cathode ray tube indicator means being constructed and arranged to utilize the shaped pulses from the pulse shaper means to provide an indication of the direction of the source of said radiant energy with respect to a preselected direction from said pair of antenna means as measured in said predetermined plane of measurement.

12. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to said pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, pulse selector means including a pair of switching circuit means operatively connected to said pair of detector means respectively, said pulse selector means being constructed and arranged whereby pulses occurring in said demodulated outputs within a predetermined time interval after other initial pulses are not passed by the switching circuit means, a pair of pulse shaper means operatively connected to and energized from said pair of switching circuit means respectively, means operatively connected to one of said pulse shaper means for inverting the output thereof, adding circuit means operatively connected to said inverter means and to the other of said pulse shaper means and having the outputs of said inverter means and said other pulse shaper means applied thereto, said adding circuit means being constructed and arranged to provide a pulse output having an amplitude proportional to the difference in amplitude of the input pulses applied thereto from the inverter means and the pulse shaper means and a pulse polarity which varies selectively in accordance with which of the input pulses has the greater amplitude, and cathode ray tube indicator means having beam forming means and a pair of deflection plates, said cathode ray tube indicator means being operatively connected to said adding circuit means, the output of said adding circuit means being applied to said pair of deflection plates whereby said beam is selectively deflected in a predetermined plane in one direction or the opposite direction and in an amount controlled by the polarity and amplitude of the pulse obtained from the adding circuit means to thereby provide an indication of the direction of said source of radiant energy from the passive radar apparatus.

13. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to the pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, pulse selector means including a pair of switching circuit means operatively connected to said pair of detector means respectively, said pulse selector means being constructed and arranged whereby pulses occurring in said demodulated outputs within a predetermined time interval after other initial pulses are not passed by the switching circuit means, a pair of pulse shaper means operatively connected to the pair of switching circuit means respectively and having the outputs of the switching circuit means applied thereto, adding means operatively connected to said pair of pulse shaper means for obtaining from the outputs thereof a pulse having an amplitude proportional to the difference in amplitudes of the outputs of the pulse shaper means and having a pulse polarity which varies in accordance with variations in the relative amplitudes of the pulse outputs of the pulse shaper means, and cathode ray tube indicator means operatively connected to the adding means and having the pulse of variable amplitude and polarity applied thereto, said cathode ray tube indicator means being constructed and arranged to utilize said last named pulse to provide an indication of the direction of said source of radiant energy from the direction finding apparatus as measured in said predetermined plane.

14. In radio detection and direction finding apparatus, in combination, a pair of radiant energy receiving antenna means adapted to receive pulses of radiant energy, said pair of antenna means having similar directional patterns of response, said pair of antenna means being disposed in predetermined positions with respect to each other whereby the patterns of response overlap to a predetermined degree in a predetermined plane, a pair of detector means operatively connected to the pair of antenna means respectively for obtaining demodulated outputs therefrom in the form of chains of pulses, the pulses in the output of each of said detector means being substantially proportional in amplitude to the signal strength applied to the detector means in accordance with the directional pattern of response of the antenna means operatively connected thereto, pulse selector means including a pair of switching circuit means operatively connected to said pair of detector means respectively, said pair of switching circuit means including a pair of gated circuits respectively, said pulse selector means including gate producing means operatively connected to said pair of gated circuits, said pulse selector means also including a pair of pulse shaper circuits energized from said pair of gated circuits respectively and means including delay means operatively connecting the gate producing means to said pair of pulse shaper circuits to terminate pulses produced therein, and indicator means operatively connected to said pulse selector means, said indicator means being constructed and arranged to utilize the outputs of the pulse selector means to provide an indication of the direction of said source of radiant energy from the direction finding apparatus as measured in said predetermined plane.

References Cited by the Examiner
UNITED STATES PATENTS

| | | | |
|---|---|---|---|
| 2,422,122 | 6/1947 | Norton | 343—114.5 |
| 2,426,218 | 8/1947 | Hopgood | 343—108 |
| 2,521,016 | 9/1950 | Miller. | |
| 2,771,601 | 11/1956 | Stewart | 343—16 X |

FOREIGN PATENTS

| | | | |
|---|---|---|---|
| 520,606 | 4/1940 | Great Britain. | |

LEWIS H. MYERS, *Primary Examiner.*

CHESTER L. JUSTUS, *Examiner.*